READOUT AND RADIX CONVERSION FROM A MECHANICAL REGISTER TO A CAPACITIVE STORAGE

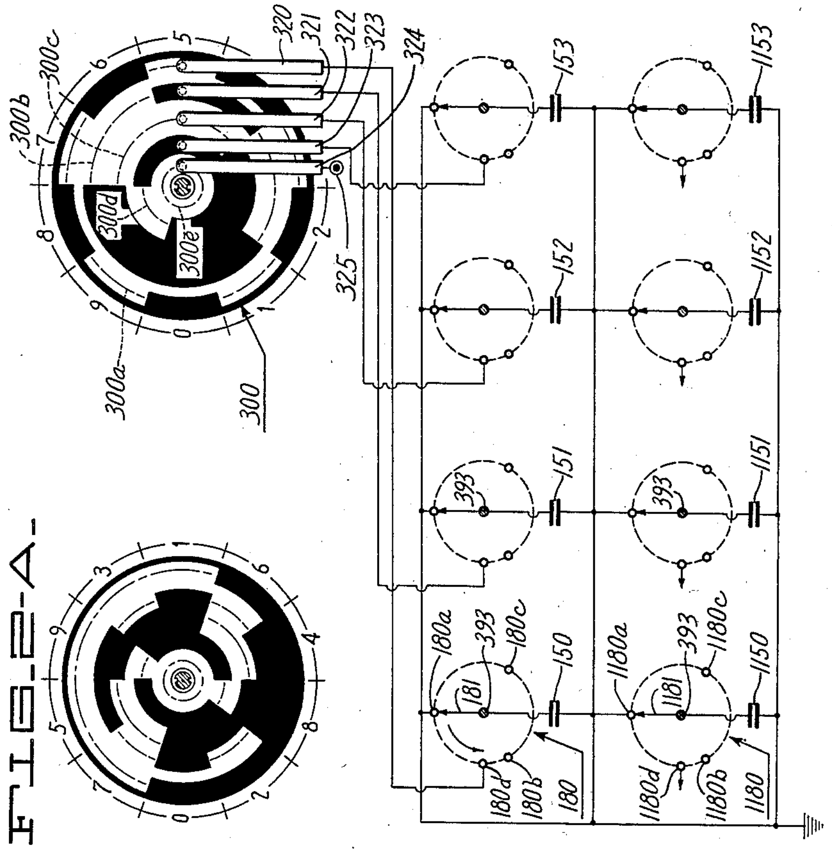
FIG. 2-A, FIG. 2
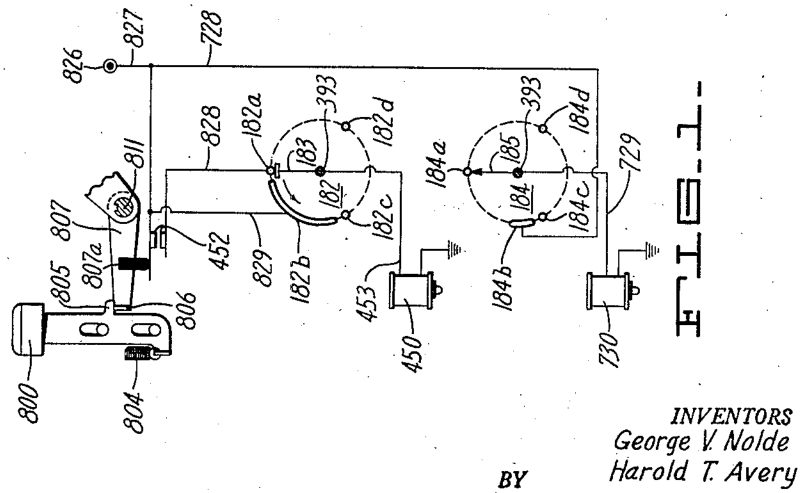
FIG. 1
INVENTORS
George V. Nolde
Harold T. Avery
BY
Howard M. Dustin

Filed March 6, 1953

INVENTORS
George V. Nolde
Harold T. Avery
BY
Howard M. Dustin

INVENTORS
George V. Nolde
Harold T. Avery
BY
Howard N. Dustin

United States Patent Office 2,822,130

Patented Feb. 4, 1958

2,822,130

READOUT AND RADIX CONVERSION FROM A MECHANICAL REGISTER TO A CAPACITIVE STORAGE

George V. Nolde, Berkeley, and Harold T. Avery, Oakland, Calif., assignors to Marchant Calculators, Incorporated, a corporation of California Application March 6, 1953, Serial No. 340,842

8 Claims. (Cl. 235—61)

The present invention concerns calculating machines, and more particularly concerns means for sensing the numeral values displayed in a mechanical register and thereby causing entry of electrical representations of the sensed values into an electrical memory.

In a calculating machine, such as described in the copending application Serial No. 340,841, filed on even date herewith, now Patent No. 2,771,599, issued November 20, 1956, where intermediate and final results are stored in an electrical memory, the nature of the memory is such that the stored values are removed after a readout operation. It is therefore desirable to provide a "read-in" mechanism which is capable of sensing the numeral values in the mechanical register and which is further capable of entering those values into the memory, so that a problem may be started using the values already shown in the register, and the register may be cleared to receive a new result.

It is therefore a principal object of the present invention to sense the numeral values standing in a mechanical register and translate these values into electrical value-representing conditions in a memory.

It is another object to transfer numeral value representations from a mechanical register to an electrical memory.

It is a further object to translate representations of numeral values in a first radix into representations of the same numeral values in a second radix.

It is a more specific object to translate decimal representations of numeral values into four-signal binary representations of the same values.

The present invention is therefore based upon the principle of correlating representations of equivalent numeral values in two different radices for translating numeral values from one of the radices to the other.

Other objects and principles will appear in the following detailed description of the invention, reference being made to the accompanying drawings in which:

Fig. 1 is a wiring diagram of the read-in control circuit.

Fig. 2 is a wiring diagram of the memory and rotary switches, and a typical ordinal read-in disc, shown enlarged.

Fig. 2*a* is an enlarged left side view of a second embodiment of a read-in disc.

Figure 3:
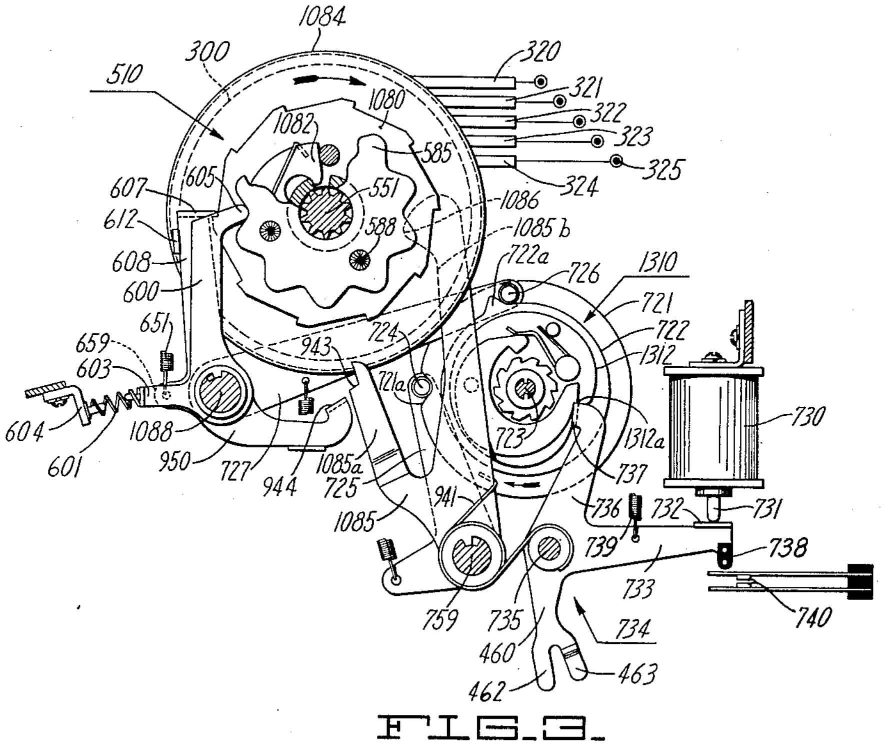

Fig. 3 is an enlarged right side view of a typical ordinal dial clutch and clearance control mechanism therefor.

Figure 4:
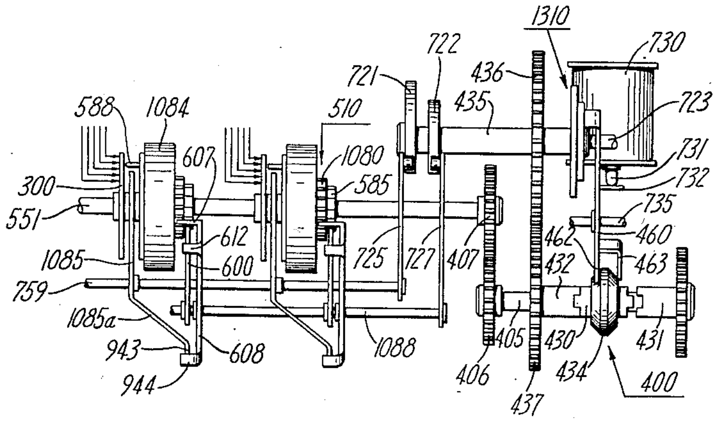

Fig. 4 is a top view of the numeral wheels and their related control mechanism.

Figure 5:
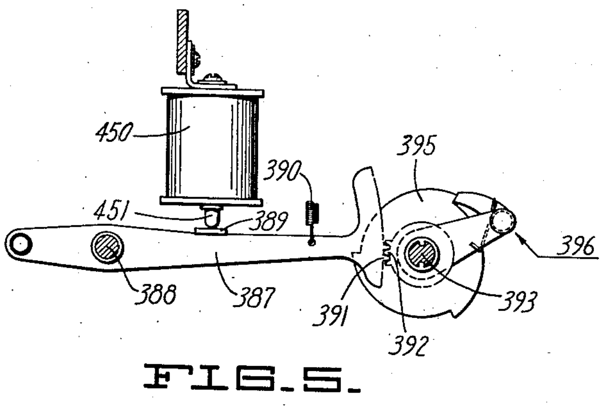

Fig. 5 is a left side view of the rotary switch operating mechanism.

Figure 6:
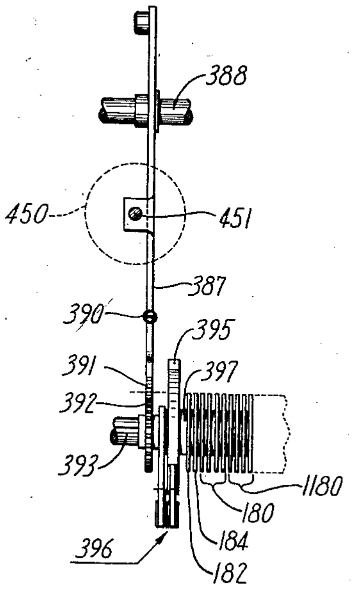

Fig. 6 is a top view of the rotary switch operating mechanism.

GENERAL DESCRIPTION

The machine embodying the present invention includes an electrical memory of the type described in the copending application Serial Nos. 219,059 and 219,060, filed April 3, 1951, now Patent Nos. 2,690,302 and 2,690,303 respectively, issued September 28, 1954, and a mechanical numeral wheel register of the type disclosed in Avery Patent No. 2,416,369, issued February 25, 1947. The memory is arranged to store representations of ordinal numeral values in a modified, or "coded" binary system. When a problem is completed, the accumulated result is read out, by mechanism disclosed in the previously named application Serial No. 340,841, into the mechanical register which displays the result in the decimal system.

If the machine operator wishes to employ the values displayed in the register for a subsequent calculation, it is convenient to transfer those values into the memory and clear the register. The read-in mechanism of the present invention is provided for this purpose.

The read-in operation is arranged to occur upon entry into the machine of a first item or factor following the reading out of a previous result. Read-in is divided into two steps, viz: (1) the values stored in the numeral wheel register are entered into the memory which normally stands cleared at the beginning of the operation; and (2) the register is cleared.

MEMORY UNIT

The memory unit, of which two denominational orders are shown in Fig. 2, comprises a plurality of ordinal groups of storage capacitors. There are four capacitors in each ordinal group, such as capacitors 150—153 in the lowest denominational order. Each capacitor has two conditions of operation, viz: (1) charged to a standard potential; or (2) substantially uncharged. An uncharged condition of any capacitor represents the numeral value "0," while the charged condition of any capacitor represents a numeral value other than "0." The four capacitors of any ordinal group, such as 150—153, represent, when charged, the numeral values "1," "2," "4," and "8," respectively.

During a calculation, the memory capacitors are charged and discharged, in accordance with accumulated results of the calculation, by a counting circuit such as those disclosed in the above-named applications Serial Nos. 219,059 and 219,060.

*Rotary switches*

Each memory capacitor, such as 150, is associated with a rotary switch, such as 180 (Figs. 2 and 6) each having a respective switch arm, such as 181 mounted upon a hub 397 (Figs. 5 and 6) for rotation with a shaft 393. The high potential side of each capacitor is connected to the switch arm of the related rotary switch. Although only two ordinal groups of capacitors, 150—153 and 1150—1153, and their related rotary switches 180 and 1180, are shown in Fig. 2, it is to be understood that the third and subsequent denominational orders are similar in both structure and function to those shown.

Prior to a calculation on the machine, embodying the present invention, the switch arms 181, 1181, etc., are in their vertical positions at grounded contacts **180*a*, 1180*a*, etc., respectively, as shown in Fig. 2, so that all memory capacitors are uncharged, thus constituting a cleared memory. During the operation preliminary to a calculation, the switch arms are rotated 120° counterclockwise (as viewed in Fig. 2), by means hereinafter described, to carry each switch arm past, and into momentary contact with, a respective read-in contact, such as 180*d*. Contacts 180*d*, 1180*d***, etc., are connected to the related numeral wheel orders and cause a potential transfer to the memory capacitors, in the manner described hereinafter, in accordance with the values displayed on the numeral wheels.

NUMERAL WHEEL REGISTER

The numeral wheel register of the present machine comprises ordinal numeral wheels 1034 (Figs. 3 and 4) mounted for rotation in ordinally spaced relationship on a numeral wheel spline shaft 551. A respective pawl-and-ratchet type dial clutch 510, of the type shown in Fig. 27 of the previously named Avery Patent No. 2,416,-369, is integral with each numeral wheel. Reference is made to the Avery patent for a full description of the operation of the dial clutch.

The control mechanism for the dial clutch includes an ordinal clutch dog 608 loosely keyed to a shaft 1088. An ear 607 on dog 608 is normally in operative contact with a ratchet 1080 of the clutch, thereby restraining the ratchet from rotation to maintain the clutch normally disengaged. A spring 651 urges the dog clockwise to its clutch disengaging position shown, and engagement of the clutch is caused by rocking the dog 608 counterclockwise (as viewed in Fig. 3) out of contact with ratchet 1080.

A centralizer pawl 600 in each order is mounted for free rocking movement on the shaft 1088 and has a nose 605 which cooperates with notches of a respective centralizer disc 585 integral with each numeral wheel. A member 604 mounted on the machine frame supports a toggle spring 601 which cooperates with an arm 603 on pawl 600 to maintain the pawl normally in a clockwise position in engagement with the centralizer disc 585. When the clutch is engaged, the disc 585 rotates with the numeral wheel, camming the nose 605 of pawl 600 to the left to rock the pawl counterclockwise upon shaft 1088, whereupon toggle spring 601 yieldably retains pawl 600 in its counterclockwise position. An ear 612 on the clutch dog 608 overlies pawl 600 and limits the counterclockwise rocking of the latter pawl. When the clutch dog 608 is subsequently rocked clockwise to disengage the clutch, the ear 612 forces pawl 600 clockwise, and toggle spring 601 yieldably retains pawl 600 in its clockwise position in engagement with a notch on disc 585 to thereby centralize the numeral wheel in a full digital position.

READ-IN MECHANISM

*In general*

The read-in operation is arranged to occur in response to a first depression of a calculation key following a readout operation. A read-in solenoid is energized to operate mechanism for sequentially (1) charging each ordinal group of memory capacitors in accordance with the numeral value displayed in the corresponding numeral wheel, and (2) initiating a clearance operation.

*Read-in solenoid*

Referring to Fig. 1, a single calculation key 800 is shown, which may be, for example, a "+" or a "*x*" key, although it will be apparent that any of a number of calculation keys may be used to initiate the read-in operation.

Key 800 is conventionally arranged for vertical movement, and is normally maintained in its upward position by a spring 804. An ear 805 on the key stem overlies an ear 806 on an arm 807, keyed to a shaft 811 which is mounted for rocking movement on the machine frame. A lug **807*a* made of insulating material extends downward from arm 807 and cooperates with the upper blade of a read-in initiating switch 452. Depression of key 800 rocks arm 807 counterclockwise about shaft 811, closing switch 452** which is subsequently reopened by releasing the key.

The upper blade of switch 452 is connected to a power source 826 through a lead 827. The lower blade of switch 452 is connected by a lead 828 to a contact **182*a* of a rotary switch 182 having a switch arm 183 mounted on the previously described rotary switch hub 397 (Figs. 5 and 6). The switch arm 183 of switch 182 is connected by a lead 453 to the read-in solenoid 450 (Figs. 1, 5 and 6) and normally rests at the position shown in engagement with contact 182*a***.

The plunger 451 (Fig. 5) of solenoid 450 overlies an ear 389 of a lever 387 mounted for rocking movement on a shaft 388. A spring 390 normally maintains lever 387 in the counterclockwise position shown in Fig. 5, while the right hand end of lever 387 terminates in a gear segment 391 which cooperates with a gear 392 rotatably mounted on the previously mentioned shaft 393 (Figs. 5 and 6) on which the rotary switch arms 181, 1181, etc. (Fig. 2) are mounted. A pawl mechanism 396 is integral with gear 392 and is also rotatably mounted on shaft 393. A ratchet 395 having three teeth equally spaced at 120°, is fixed on shaft 393 and cooperates with pawl 396.

When key 800 (Fig. 1) is depressed, closing the read-in initiating switch 452, as described above, the read-in solenoid 450 is energized. Energization of the solenoid extends plunger 451 (Fig. 5) downward against ear 389, rocking lever 387 clockwise, thereby rotating gear 392, pawl 396, ratchet 395, shaft 393, hub 397 and switch arms 183, 181, 1181, etc., counterclockwise.

A second contact **182*b* on the rotary switch 182 subtends an angle slightly less than 120° and is positioned so that it is closely adjacent to the contact 182*a*. Contact 182*b* is directly connected to the power source 826 through a lead 829 and the lead 827. Switch arm 183 of the rotary switch 182 has a wide contact angle so that it begins to wipe contact 182*b* before it has broken connection with contact 182*a*. Therefore, when the switch arm 183 is rotated counterclockwise past contact 182*a*, in the manner described above, the read-in solenoid remains energized through the circuit comprising the power source 826, leads 827 and 829, contact 182*b*, switch arm 183, lead 453, the solenond 450** and ground.

After slightly less than 120° of rotation, the switch arm 183 is rotated past contact **182*b* and is then carried to, and maintained on, a blank contact 182*c*, by any appropriate centralizing mechanism (not shown). The arrangement of solenoid 450 (Fig. 5) is such that a full extension of the plunger 451 rocks arm 387 sufficiently to cause a 120° rotation of the gear 392, ratchet 395, shaft 393, and switch arms 183, 181, 1181**, etc.

The 120° rotation of shaft 393 due to energization of the read-in solenoid 450 causes switch arms 181, 1181, etc., (Fig. 2) to engage their respective read-in contacts **180*d*, 1180*d***, etc., thereby causing a potential transfer from the numeral wheel register to the memory as follows.

*Read-in sensing discs*

In each denominational order of the numeral wheel register, a respective sensing disc 300 (Figs. 2 and 4) is made integral with each numeral wheel 1084 for rotation therewith upon shaft 551. Each disc 300 is divided into ten sectors, corresponding to the numerals "0" and "1–9," respectively, on the related numeral wheel. The disc 300 is further divided into five concentric rings **300*a*, 300*b*, 300*c*, 300*d*, and 300*e*. The outmost ring 300*a* is associated with the lowest value capacitor, such as 150, of the corresponding memory order, representing the numeral value "1." The second, third and fourth rings 300*b*, 300*c*, and 300*d*, are associated with the respective second, third and fourth capacitors, such as 151–153**, of the corresponding memory order, representing the numeral values "2," "4" and "8," respectively.

The disc is formed of insulation material upon which is fixed a continuous pattern of conductive material. The innermost ring **300*e* is a voltage supply ring and is formed entirely of conductive material. In the sector representing the numeral value "0," the segments of rings 300*a*—300*d* are all formed of insulating material. In the sector which represents the value "1," the segment of ring 300*a***, likewise representing the value "1," is formed of conductor. Similarly, in each of the other sectors the appropriate segments, collectively representing the numeral value of the given sector, are formed of conductive material, whereas the remaining segments in each sector are formed of insulation material.

The pattern of conductive material on a disc 300 is illustrated in Table I where an X indicates that the segment of the designated ring is formed of conductor in the designated sector.

TABLE I

| Rings | Sectors | | | | | | | | | |
|---|---|---|---|---|---|---|---|---|---|---|
| | 0 | 1 | 2 | 3 | 4 | 5 | 6 | 7 | 8 | 9 |
| 300a | ---- | X | ---- | X | ---- | X | ---- | X | ---- | X |
| 300b | ---- | ---- | X | X | ---- | ---- | X | X | ---- | ---- |
| 300c | ---- | ---- | ---- | ---- | X | X | X | X | ---- | ---- |
| 300d | ---- | ---- | ---- | ---- | ---- | ---- | ---- | ---- | X | X |
| 300e | X | X | X | X | X | X | X | X | X | X |

A set of five fixed brushes 320–324 cooperates with each ordinal disc 300. Each brush wipes a respective ring on the disc 300, and is electrically connected to the read-in contact, such as **180*d*, of the rotary switch related to that ring. The brush 324 which wipes ring 300*e* is permanently connected to a power source 325 having a potential level equal to the potential of a unit charge on a memory capacitor. Therefore, a unit charge of potential is constantly applied to the entire conducting pattern on each disc 300. It will appear, then, that at whatever digital position a numeral wheel stands, the brushes 320–323 in the related denominational order are energized by the conductive pattern in accordance with the decimal code of the numeral wheel. Therefore, when the rotary switch arms 181, 1181, etc., wipe contacts 180*d*, 1180*d***, etc., in the manner described above, the various memory capacitors are charged to the unit potential level in accordance with the numeral values displayed in the register.

*Alternate embodiment of sensing disc*

In Fig. 2A, an alternate embodiment of the sensing disc is shown. The numeral sectors of the disc in Fig. 2A are arranged in irregular order in accordance with the numeral wheels shown in the second embodiment of the readout mechanism disclosed in the above mentioned copending application Serial No. 340,841. Just as in Fig. 2, the respective rings are formed of conductor or insulator in the various sectors in accordance with the code illustrated in Table I.

*Clear clutch solenoid*

As the final step in the read-in operation, the numeral wheel register is cleared after the memory capacitors have been charged in accordance with the values displayed in the register.

The register is cleared by engaging each dial clutch until a zero registration is attained. A clear clutch solenoid is energized to engage a clear clutch which rotates two cams. These cams operate mechanism to rock all the clutch dogs out to the clutch engaging positions, and hold each clutch dog out by an individual latch. As each dial approaches the zero position, its related ordinal latch is automatically tripped to disengage the dial clutch and stop rotation of the dial at zero registration.

A clear clutch rotary switch 184 (Figs. 1 and 6) has a switch arm 185 mounted on the hub 397 (Figs. 5 and 6) for rotation with the rotary switch shaft 393. The switch arm 185 is electrically connected to a clear clutch solenoid 730 (Figs. 1, 3 and 4) by a lead 729 (Fig. 1). This switch arm initially stands at a blank contact **184*a* and is rotated 120° counterclockwise past a clearance contact 184*b* to a second blank contact 184*c* when shaft 393 is rotated under control of the read-in solenoid 450** as previously described.

Contact **184*b* is connected to the power source 826 by a lead 728 and lead 827. Therefore, the clear clutch solenoid 730 is energized through the circuit comprising power source 826, leads 827 and 728, contact 184*b*, switch arm 185, lead 729, the solenoid 730**, and ground.

*Clear clutch*

Referring to Fig. 3, the clear clutch solenoid 730 is mounted on the machine frame and has a plunger 731 which is extended downward when the solenoid is energized. The plunger 731 overlies an ear 732 on a lower arm 733 of a bellcrank 734 mounted for rocking movement on a shaft 735. An upper arm 736 on bellcrank 734 functions as a clutch dog in cooperation with a clear clutch 1310 (Figs. 3 and 4) rotatably mounted on a spline shaft 723.

The clear clutch may be of any conventional single-cycle type, but is illustrated in Fig. 3 as the ratchet-type clutch shown in Fig. 3 of Avery Patent No. 2,162,238, issued June 13, 1939, and fully described in that patent.

A spring 739 connected between the machine frame and the lower arm 733 of bellcrank 734 normally maintains an ear 737 on the upper bellcrank arm 736 engaged in a notch **1312*a* on a clutch disc 1312, maintaining the clutch disengaged so that it cannot rotate with shaft 723. When the clear clutch solenoid is energized, its plunger 731 rocks the bellcrank 734 clockwise, lifting ear 737 out of notch 1312*a*, thereby engaging the clutch 1310, by mechanism described in the last-named Avery patent, so that the clutch is permitted to rotate clockwise with shaft 723**.

A lug 738 on the lower arm 733 of the bellcrank 734 overlies the upper blade of a normally open switch 740 in series with a power source and the machine motor (not shown). When bellcrank 734 is rocked clockwise by the clear clutch solenoid, lug 738 closes switch 740 to start the machine motor and thereby rotate shaft 723 (Figs. 3 and 4).

Therefore, energization of solenoid 730 causes rotation of shaft 723 and causes the clear clutch to engage that shaft for rotation therewith. Solenoid 730 is de-energized before clutch 1310 has completed one cycle of rotation, so that arm 736 is rocked counterclockwise until ear 737 rides against the rotating clutch disc 1312. At the end of one complete cycle of rotation of clutch 1310, notch **1312*a* rides under ear 737 of bellcrank 734, and the bellcrank rocks counterclockwise, disengaging the clutch at the end of exactly one rotation and reopening switch 740** to stop the machine motor.

*Latching and clearance cams*

A latching cam 721 and a clearance cam 722 (Figs. 3 and 4) are secured to a hub 435 rotatably mounted on the clear clutch shaft 723 and integral with the clear clutch for rotation therewith.

Cam 721 has on its periphery a single notch **721*a* in which a cam follower roller 724 normally rests. Roller 724 is mounted on the free end of a lever 725 keyed to a latching shaft 759. Cam 722 has a single lobe 722*a* which normally rests slightly counterclockwise of a cam follower roller 726 which is mounted on the free end of a lever 727 keyed to the clutch dog shaft 1088**.

When the clear clutch is engaged and rotated one cycle clockwise, thereby rotating cams 721 and 722 one cycle clockwise, the lobe **722*a* on cam 722 rides under roller 726 shortly after the cycle begins, so that lever 727, shaft 1088 and the clutch dogs 608** are rocked counterclockwise momentarily to engage all the dial clutches. The clutch dogs are latched in clutch engaging position in the following manner.

A latching lever 1085 in each denominational order is loosely keyed to the latching shaft 759. A respective torsion spring 941 normally maintains each lever 1085 in its counterclockwise position in the loose keyway of shaft 759. A first arm **1085*a* on each lever 1085 has a latching notch 943 adapted for cooperation with an ear 944 on a lower arm 950 of the related ordinal clutch dog 608. The latching shaft 759 is normally in a clockwise position, as shown in Fig. 3, so that the notch 943 is held out of engagement with ear 944** of the clutch dog.

When the clear clutch is engaged to rotate cams 721 and 722 clockwise, the notch 721a on cam 721 rotates from beneath roller 724 at substantially the same time that lobe 722a rides under roller 726. Therefore, lever 725, shaft 759, and the ordinal latching levers 1085 are rocked counterclockwise at substantially the same time that the clutch dogs 608 are rocked counterclockwise to engage the dial clutches. Notch 943 on each latching lever arm 1085a engages ear 944 on the related ordinal clutch dog arm to latch the clutch dogs in their counterclockwise position, and levers 1085 are maintained in their counterclockwise position by spring 941.

A second arm 1085b on each lever 1085 has a nose 1086 which is positioned in the path of a stud 588 integral with the rotating dial clutch mechanism. When a numeral wheel approaches the zero position, its stud 588 cams the nose 1086 of the related lever arm 1085b to the right, thereby rocking lever 1085 clockwise in the loose keyway of shaft 759 sufficiently to unlatch the clutch dog, which is then spring urged clockwise to disengage the dial clutch so that the numeral wheel is brought to zero registration by the centralizer 600.

*Numeral wheel drive mechanism*

When the bellcrank 734 (Fig. 3) is rocked clockwise to close the machine motor switch 740, as described hereinbefore, the motor drives the numeral wheel shaft 551 in the following manner.

It is recalled that the machine motor drives the clear clutch shaft 723 directly. A gear 436 (Fig. 4) is keyed to the previously described hub 435 rotatably mounted on the clear clutch shaft 723. Hub 435 is integral with the clear clutch so that when the clutch is engaged, hub 435 and gear 436 rotate. Gear 436 drives a gear 437 rotatably mounted on a shaft 405. Gear 437 is integral with a member 432 of a drive direction control, or reversing mechanism 400 of the type shown in Fig. 5 of the previously mentioned Avery Patent No. 2,162,238, and fully described in that patent.

The reversing mechanism has two drive members 431 and 432 rotatably mounted on the shaft 405, and has a central driven member 430, slidably keyed to shaft 405. A gear 406, keyed to shaft 405 meshes with a gear 407 keyed to the numeral wheel shaft 551.

A collar 434, integral with member 430, is shiftable laterally in either direction to engage member 430 with either of the drive members 431 or 432. The collar 434, and therefore member 430, is normally maintained in its rightward position for purposes described in the previously named application Serial No. 340,841, so that member 431 normally drives member 430, shaft 405, gears 406 and 407, and the numeral wheel shaft 551.

During a clearance operation, however, member 430 is shifted to the left into engagement with the drive member 432, so that shaft 405 is driven by member 432. An arm 460 (Figs. 3 and 4), extending downward from the bellcrank 734, is provided with two fingers 462 and 463. The finger 462 is disposed on the left side of collar 434 (as viewed in Fig. 4), and finger 463 on the right side thereof, so that when bellcrank 734 is rocked clockwise (as viewed in Fig. 3) by solenoid 730, finger 463 bears on collar 434 to force member 730 to the left into engagement with drive member 432.

Therefore, energization of the clear clutch solenoid does three things, viz: (1) it starts the machine motor to drive the clear clutch shaft 723; (2) it engages the clear clutch to rotate gear 436 and cams 721 and 722; (3) it shifts the direction control member 430 to the left so that the numeral wheel shaft 551 is driven through member 432.

At the end of a clearance cycle, when bellcrank 734 (Fig. 3) is rocked counterclockwise, the finger 462 bears on collar 434, forcing member 430 back to the right (as viewed in Fig. 4) to its normal position of engagement with drive member 431, thereby preparing the machine for calculation.

I claim:

1. In a device of the class described, the combination of: a movable indicia-bearing member; a capacitive memory unit adapted to store electrical charges collectively representing respective ones of said indicia; a sensing locus; means fixed at said locus for sensing said indicia; a source of reference potential; first switch means for connecting said memory unit to said source of reference potential for discharging said memory unit; second switch means for connecting said sensing means to the memory unit for storing, in the memory unit, electrical charges representing a sensed indicium; an operating key; and switch control means operable in response to successive depressions of said key for operating said first and second switch means seriatim.

2. In a device of the class described, the combination of: a movable indicia-bearing member; a capacitive memory unit adapted to store electrical charges collectively representing respective ones of said indicia; a sensing locus; means fixed at said locus for sensing said indicia; first switch means for connecting said sensing means to the memory unit for storing, in the memory unit, charges representing a sensed indicium; clearance mechanism for moving said member to an index position; second switch means for energizing said clearance mechanism; an operating key; and switch control means operable in response to a single depression of said key for operating said first and second switch means seriatim.

3. In a device of the class described, the combination of: a movable indicia-bearing member; a memory unit adapted to store manifestations of respective ones of said indicia; a sensing locus; means fixed at said locus for sensing said indicia; first switch means for connecting said sensing means to the memory unit for storing, in the memory unit, a manifestation of a sensed indicium; clearance mechanism for moving said member to an index position; second switch means for energizing said clearance mechanism; an operating key; and switch control means operable in response to a single depression of said key for operating said first and second switch means seriatim.

4. In a device of the class described, the combination of: a movable indicia-bearing member; a memory unit adapted to store manifestations of respective ones of said indicia; a sensing locus; means fixed at said locus for sensing said indicia; first switch means for clearing said memory unit; second switch means for connecting said sensing means to the memory unit for storing, in the memory unit, a manifestation of a sensed indicium; an operating key; and switch control means operable in response to successive depressions of said key for operating said first and second switch means seriatim.

5. In a device of the class described, the combination of: a movable indicia-bearing member; an indicating locus; means for moving said member to a position for indicating a selected indicium at said indicating locus; a memory unit including a plurality of capacitors adapted to store electrical charges collectively representing respective ones of said indicia; a respective stepping switch associated with each capacitor, said switch having first and second contacts, and having a switch arm connected to its associated capacitor; a source of reference potential; a respective connection from the first contact of each stepping switch to said source of reference potential for discharging said capacitors when said switch arms engage their respective first contacts; a sensing locus; sensing means fixed at said sensing locus; means associated with said indicia-bearing member for energizing said sensing means to represent the indicium at said indicating locus; a respective connection from the sensing means to the second contact of each stepping switch and operable, when said switch arms engage their respective second contacts, to charge said capacitors in accordance with the energization of said sensing means; drive means operable, upon energization thereof, for moving each of said switch arms into successive engagement with its respective first and second contacts; and selectively operable means for energizing said drive means.

6. The combination defined in claim 5, wherein said selectively operable means comprises a single, manually-operable key.

7. In a device of the class described, the combination of: a movable indicia-bearing member; an indicating locus; means for moving said member to a position for indicating a selected indicium at said indicating locus; a memory unit including a plurality of memory devices adapted to store manifestations of respective ones of said indicia; a respective stepping switch associated with each memory device, said switch having first and second contacts, and having a switch arm connected to its associated memory device; memory-clearing means; a respective connection from the first contact of each stepping switch to said memory-clearing means for clearing said memory devices when said switch arms engage their respective first contacts; a sensing locus; sensing means fixed at said sensing locus; means associated with said indicia-bearing member for energizing said sensing means to represent the indicium at said indicating locus; a respective connection from the sensing means to the second contact of each stepping switch and operable, when said switch arms engage their respective second contacts, to store in said memory devices an indicium-manifestation corresponding to the energization of said sensing means; drive means operable, upon energization thereof, for moving each of said switch arms into successive engagement with its respective first and second contacts; and selectively operable means for energizing said drive means.

8. The combination defined in claim 7, wherein said selectively operable means comprises a single, manually-operable key.

References Cited in the file of this patent

UNITED STATES PATENTS

| | | |
|---|---|---|
| 351,369 | Ferguson | Oct. 26, 1886 |
| 1,332,961 | Tanner | Mar. 9, 1920 |
| 2,002,219 | Dimond | May 21, 1935 |
| 2,127,733 | Herbst | Aug. 23, 1938 |
| 2,302,769 | Haselton et al. | Nov. 24, 1942 |
| 2,318,591 | Couffignal | May 11, 1943 |
| 2,338,636 | Goodrum et al. | Jan. 4, 1944 |
| 2,533,242 | Gridley | Dec. 12, 1950 |